United States Patent
Broberg et al.

(10) Patent No.: US 10,631,110 B2
(45) Date of Patent: Apr. 21, 2020

(54) HEARING AID WITH A PRE-STRESSED BATTERY SPRING

(71) Applicant: Widex A/S, Lynge (DK)

(72) Inventors: Oskar Myhre Broberg, Hellerup (DK); Jorgen Mejner Olsen, Hillerod (DK); Kennie Falk Havn, Copenhagen (DK)

(73) Assignee: Widex A/S, Lynge (DK)

( * ) Notice: Subject to any disclaimer, the term of this patent is extended or adjusted under 35 U.S.C. 154(b) by 633 days.

(21) Appl. No.: 14/660,275

(22) Filed: Mar. 17, 2015

(65) Prior Publication Data

US 2015/0249893 A1 Sep. 3, 2015

Related U.S. Application Data

(63) Continuation-in-part of application No. PCT/EP2012/076124, filed on Dec. 19, 2012.

(51) Int. Cl.
*H04R 25/00* (2006.01)
*H01M 2/30* (2006.01)
*H01M 2/02* (2006.01)

(52) U.S. Cl.
CPC ........ *H04R 25/602* (2013.01); *H01M 2/0222* (2013.01); *H01M 2/30* (2013.01); *H01M 2220/30* (2013.01)

(58) Field of Classification Search
CPC .... H04R 25/602; H01M 2/0222; H01M 2/30; H01M 2220/30

USPC ................ 381/322, 323, 324, 328
See application file for complete search history.

(56) References Cited

U.S. PATENT DOCUMENTS 3,701,862 A * 10/1972 Vignini ................. H01H 19/62
200/52 R

FOREIGN PATENT DOCUMENTS

WO 86/06919 A1 11/1986
WO 98/47319 A1 10/1998

OTHER PUBLICATIONS

International Search Report for PCT/EP2012/076124 dated Aug. 29 2013 with Written Opinion of the International Searching Authority for PCT/EP2012/076124.

* cited by examiner

*Primary Examiner* — Phylesha Dabney
(74) *Attorney, Agent, or Firm* — Sughrue Mion, PLLC

(57) ABSTRACT

A hearing aid comprises a battery compartment prepared for receiving a battery (10) and two contacts (4) arranged to draw an electrical current from an inserted battery in order to power electrical parts of the hearing aid. At least one of the contacts (4) is loaded by a pre-stressed spring (1), which comprises a body part (2) and a torque part (3), said body part (2) being arranged in a fixed attachment in a first end from where it extends to the point of battery contact in a second end, where the torque part (3) is adapted to provide a torque to the point of contact (4).

10 Claims, 3 Drawing Sheets

HEARING AID WITH A PRE-STRESSED BATTERY SPRING

RELATED APPLICATIONS

The present application is a continuation-in-part of application PCT/EP 2012076124, filed on 19 Dec. 2012, in Europe, and published as WO 2014094842 A1.

BACKGROUND OF THE INVENTION

1. Field of the Invention

The present invention relates to hearing aids. The invention further relates to a hearing aid comprising a battery compartment prepared for receiving a battery, where two contacts are arranged to draw an electrical current from an inserted battery in order to power electrical parts of the hearing aid.

A hearing aid, constructed to be carried behind the ear or within the ear, is made as small as possible for the convenience of the hearing aid user.

The compartment for the battery and the spring loaded battery contacts for establishing electrical contact to the battery take up a significant space in the hearing aid. The battery itself and the battery contacts often define the minimum possible thickness of the hearing aid.

At the same time it is important to ensure a good electrical contact between the battery surface and the contact points in order to be able to draw a sufficient electrical current to the electronics of the hearing aid, and to avoid or minimize any power loss in the transition from battery to contact point. For this purpose the point of contact should be pressed against the battery with sufficient load to get through any layer of dirt, such as grease and oxide, on the surface of the battery.

The battery compartment and spring loaded contacts must be adapted for frequent change of battery, e.g. one to two times a week. This implies that especially the contacts and the spring must be made sufficiently reliable and durable to resist this frequent handling.

2. The Prior Art

In order to provide a high load on the point of contact by a traditional hearing aid battery spring, the distance which the spring will have to be moved during insertion of a battery becomes relatively long. This will make the design of the battery compartment and the spring more complicated, or the battery insertion will be more difficult. Also, the battery springs should preferably weigh as little as possible, meaning that the material should not be made thicker than necessary.

One problem in the known spring loaded battery contacts is that it is not possible to achieve a high load of the battery contact point against the battery surface with a spring moving only a short distance, and at the same time provide a simple design comprising only few parts to assemble during manufacturing.

The tolerance on the dimensions of batteries used for hearing aids is relatively large. As an example the standard IEC 60086-2 (edition 12.0) mentions that a battery designated PR41 (which is a standard hearing aid battery) can have a thickness, or height, in the range from a minimum of 3.30 mm to a maximum of 3.60 mm. Further to this, the typical zinc-air batteries used for hearing aids have a tendency of swelling during discharging. The standard IEC 60086-1 mentions that an increase in battery thickness of 0.25 mm is allowable. Thus a battery spring in this example must be able to provide a sufficient load through the point of contact to a battery varying in thickness from 3.30 mm to 3.85 mm.

SUMMARY OF THE INVENTION

The present invention, in a first aspect, provides a hearing aid comprising a battery compartment prepared for receiving a battery and two contacts arranged to draw an electrical current from an inserted battery in order to power electrical parts of the hearing aid, at least one of said contacts being loaded by a pre-stressed spring, said pre-stressed spring comprising a body part and a torque part, said body part being arranged in a first fixed attachment in a first end from where it extends to the point of battery contact in a second end, wherein said torque part is adapted to provide a torque to the point of contact.

By a pre-stressed spring is meant a spring with internal forces and internal torque, which will affect the response of the spring when exposed to an external load. This could be done by bending the torque part with a permanent deformation, and then moving it back with elastic force alone and holding it in the original position. This will provide an internal torque to the point of contact, or to the area of the spring where the point of contact is arranged.

In an embodiment of the invention the body part and the torque part of the pre-stressed spring are made in the same piece of sheet material. This will give a simpler production with fewer spare parts. The resulting spring will also take up less space.

In an embodiment the torque part is in a fixed attachment with the body part and extends from said fixed attachment in a direction going from the second end (close to the battery contact point) towards the first end (close to the fixed attachment of the spring, where fixed attachment means that no rotation of the spring in the attachment is possible. This fixed attachment of the torque part to the body part is different from the fixed attachment of the body part. Making the body part and the torque part from the same piece of sheet material will, in praxis, make the torque part fixedly attached.

In an embodiment the body part takes up a larger area of the sheet material than the torque part. This has been found to give a good and reliable result.

In a further embodiment the body part takes up at least 50% more area of the sheet material than does the torque part. This has been found to give an even better result.

In an embodiment each of the two electrical battery contacts are loaded by a respective one of said pre-stressed springs. This may facilitate further reduction in the width of the hearing aid.

In an embodiment the battery compartment is provided with an abutment area prepared for defining the position of the battery to one side, wherein one of the pre-stressed spring loads an electrical contact on the side of the battery with the abutment.

BRIEF DESCRIPTION OF THE DRAWINGS

Embodiments of the invention will now be explained in further detail with reference to the Figs.

DETAILED DESCRIPTION

Figure 1:
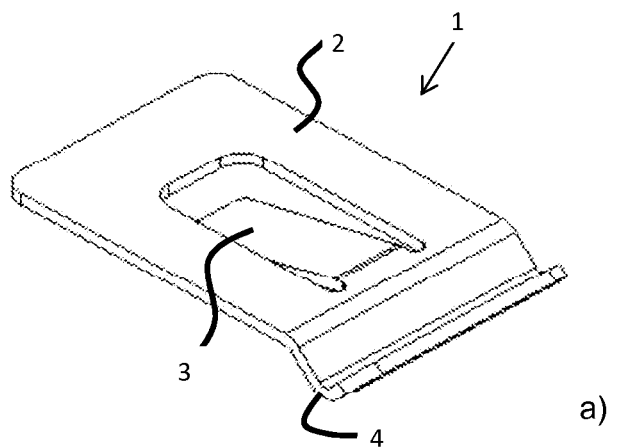
FIG. 1 illustrates an example of a battery spring, shown in three different viewing angles in panes (a), (b) and (c).
Figure 1:
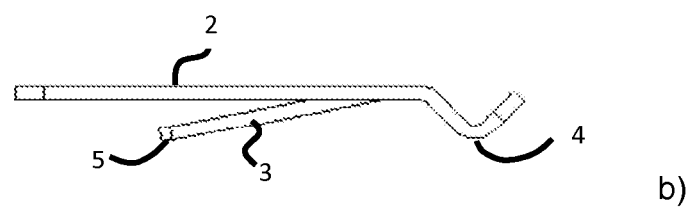
Figure 1:
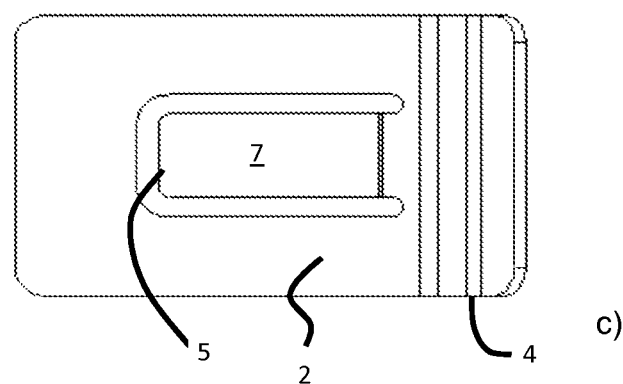

FIG. 1 shows an example of a hearing aid battery spring made from a one piece sheet metal plate and prepared to be arranged in a pre-stressed position. The top pane in FIG. 1 shows the spring 1 with a body part 2 and a torque part 3. The contact point 4 with the battery is also shown. In this example the contact point is shaped to extend over a line. The spring has been punched from a metal plate and has been bent into the shape illustrated in FIG. 1. The middle pane b) in FIG. 1 shows the spring 1 from a side view.

The spring as shown in FIG. 1 is in its relaxed position. The spring becomes pre-stressed when the tip 5 of the torque part 3 is given a load moving it back towards the plane defined by the body part 2.

Figure 2:
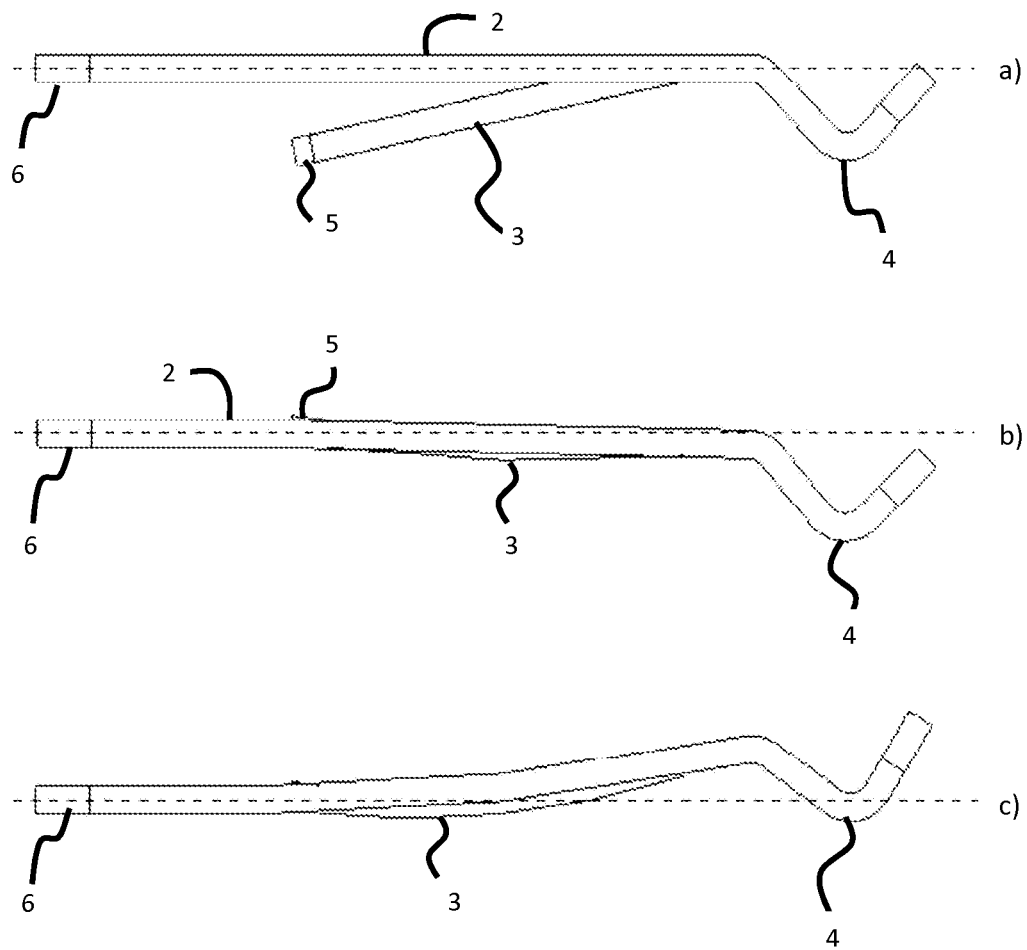
FIG. 2 illustrates a battery spring in three different positions shown in panes (a), (b) and (c).

This is illustrated in the three panes of FIG. 2 showing the spring 1 in a side view, where the top pane a) shows the relaxed position also shown in FIG. 1. The middle pane b) in FIG. 2 shows the situation where the tip 5 of the torque part 3 has been given a load moving the tip back into the plane of the body part 2. When the battery spring is mounted in a hearing aid, the torque part 2 may be arranged like this. The end 6 of the body part 2 will be arranged in a fixed attachment (i.e. no rotation possible) in, or next to, the hearing aid battery compartment.

When the tip 5 of the torque part 3 has been moved back towards the plane of the body part 2 and is restrained by some fixation means in that position, it will affect this fixation means with a spring force. It can be shown that this will result in an internal torque in the second end of the spring where the point of contact 4 is placed. This internal torque may provide a slight twist at the point of contact, but preferably the internal torque will only be seen as the battery being affected by a larger force when moving the pre-stressed battery spring.

The torque will move the point of contact 4 slightly downwards (where downwards and upwards are understood in the concept of the Figs., here FIG. 2), i.e. towards the position where the battery is to be. The torque around the point of contact will necessitate a larger force in order to move the point of contact upwards, i.e. away from the position of the battery, when inserting the battery. Thereby, the point of contact will provide the battery surface with a higher mechanical load compared to the load obtained by a battery spring which is not pre-stressed. Furthermore, this higher load is achieved by a relatively short movement of the point of contact In the lower pane c) of FIG. 2 the position of the pre-stressed spring when the battery has been inserted to the battery compartment is illustrated. It is also important that the force or the load against the battery surface can be exerted over sufficient distance in order to take tolerances on the battery dimensions into account.

Figure 3:
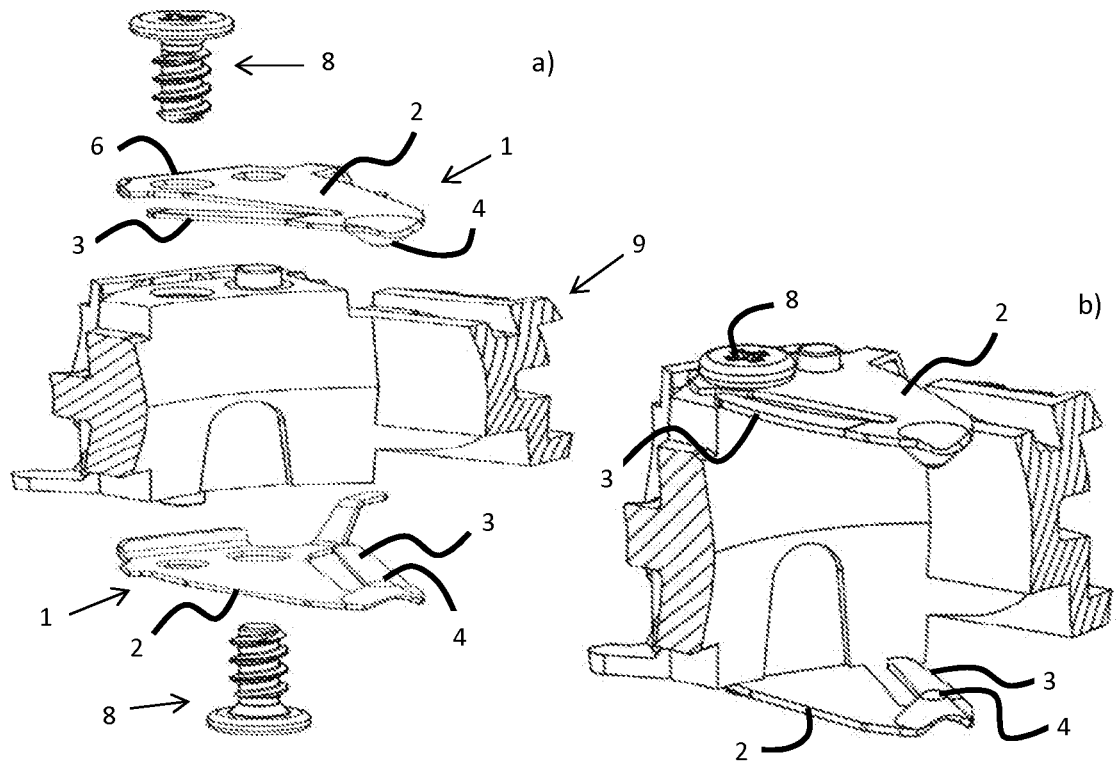
FIG. 3 illustrates the part of the hearing aid with the battery compartment and battery spring.

FIG. 3 shows an example of how the compartment for the battery could be formed. In pane a) of FIG. 3 some of the components for the battery compartment are illustrated before being assembled. Pane a) of FIG. 3 illustrates two springs 1, having a different design than the example in FIGS. 1 and 2. It is seen that the torque part 3 of the pre-stressed spring is bent out of the plane formed by the body part 2. The springs 1 become pre-stressed when the torque part 3 is moved back towards the plane of the body part 2. The pre-stressed springs are to be mounted into the block 9, which is a structure inside the hearing aid to which other components are attached or supported. Only a part of the block 9 is illustrated in FIG. 3. Screws 8 for the attachment of the pre-stressed springs to the block 9 are also illustrated.

In FIG. 3, pane b) shows the parts from pane a) assembled. It is seen that the torque part 3 of the pre-stressed spring 1 is forced into a position where it is close to being parallel with the body part 2 of the pre-stressed spring. In pane c) of FIG. 3 a battery 10 is inserted between the two pre-stressed springs 1. It is seen that the contact point 4 of the top spring is moved upwards (here understood as the direction towards the top of the paper).

The stress concentration in the material will depend on the shape of the body part as well as on the shape of the torque part. Some triangular shape of the body part with a wide part towards the end 6 where it is usually fixedly attached, and a relatively narrower part towards the contact point, could result in a more evenly distributed stress in the spring material. The load by which the torque part can affect the contact point is limited by the yield stress of the material.

The spring can be made in any material having good elastic properties. Preferably, the spring is made in conducting spring material such as a metal, e.g. stainless steel or mu metal. A non-conducting spring material may be used if coated with an electrical conductor, or, if electrical connection is made directly to the point of contact. Hearing aids are often exposed to humid conditions in use; therefore, the corrosion resistance of the material is important.

The thickness of the plate material is typically in the range 0.05-0.5 mm, preferably in the range 0.15-0.25 mm. The material is preferably hardened in the area where the bending forming the torque part is performed.

In an example of a pre-stressed spring, the torque provided by the torque part to the second end at the contact point results in the contact point being moved approximately 0.1 mm towards the position of the battery in the battery compartment. The pre-stressed spring will provide a load at the contact point against the battery of approximately 0.87 N. The same spring without being pre-stressed would only provide a load of approximately 0.55 N. A pre-stressed spring will thus increase the load by approximately 58%, compared to a traditional spring. These numbers apply when the inserted battery moves the contact point a distance of 0.15 mm. It is often preferred to design for a pre-set minimum load on a battery contact point. This should also apply to a minimum sized battery inserted after a maximum sized battery has been removed. However, as mentioned above a higher load will provide a more stable and reliable electrical contact to the battery.

In practice the battery compartment of a hearing aid is provided with two battery springs, one for a contact point on each side of the battery. Often the battery compartment is adapted such that an inserted battery will rest against an abutment in one side of the battery compartment. This abutment will have some opening or recess for the contact point or battery spring to obtain electrical contact to the battery. This means that the tolerance in the dimension of the battery has to be accommodated by only the battery spring on the side opposite this abutment. One of the two points of electric contact to the battery could also be arranged to connect to the side of the battery.

We claim:

1. A hearing aid comprising a battery compartment prepared for receiving a battery and two contacts arranged to draw an electrical current from an inserted battery in order to power electrical parts of the hearing aid, at least one of said contacts being loaded by a pre-stressed spring, said pre-stressed spring comprising a body part and a torque part, said body part being arranged in a first fixed attachment in a first end from where it extends to the point of battery contact in a second end, wherein said torque part is adapted to provide a torque to the point of contact.

2. The hearing aid according to claim 1, wherein said body part and said torque part are made in the same piece of sheet material.

3. The hearing aid according to claim 2, wherein said body part takes up a larger area of the sheet material than said torque part.

4. The hearing aid according to claim 1, wherein said torque part is in a second fixed attachment with said body part and extends from said second fixed attachment in a direction going from said second end towards said first end.

5. The hearing aid according to claim 1, wherein said body part takes up at least 50% more area of the sheet material than the area of said torque part.

6. The hearing aid according to claim 1, wherein each of the two contacts is loaded by a respective one of said pre-stressed springs.

7. The hearing aid according to claim 1, wherein said battery compartment is provided with an abutment area prepared for defining the position of the battery to one side, one of said pre-stressed spring loading an electrical contact on the side of the battery with the abutment.

8. The hearing aid according to claim 1, wherein said torque part is configured such that urging a part of said torque part in a direction away from said battery provides said torque to urge said second end toward said battery.

9. The hearing aid according to claim 1, wherein the spring has been made pre-stressed by bending the torque part with a permanent deformation and then moving it back with an elastic force.

10. The hearing aid according to claim 1, wherein the spring has been made pre-stressed by providing a load to a part of said torque part to move said part of said torque part toward a plane defined by said body part.

* * * * *